United States Patent Office 2,989,552
Patented June 20, 1961

2,989,552
4-ORGANOTHIOMETHYL-3-OXO-Δ⁴ STEROIDS AND METHODS FOR PREPARING SAME
David Neville Kirk and Vladimir Petrow, London, England, assignors to The British Drug Houses Limited, London, England, a company of Great Britain
No Drawing. Filed Nov. 16, 1959, Ser. No. 852,971
Claims priority, application Great Britain Nov. 19, 1958
28 Claims. (Cl. 260—397.3)

This invention is for improvements in or relating to organic compounds and has particular reference to new 4-organothiomethyl-3-oxo-Δ⁴-steroids, and a process for their preparation.

It is an object of the invention to provide new 4-organothiomethyl-3-oxo-Δ⁴-steroids which group of compounds has not previously been known and which are useful on account of their valuable biological properties or as intermediates in the preparation of compounds having valuable biological properties such for example as 4-methyl-steroids. Thus, for example, the 4-(organothiomethyl)testosterone derivatives, the 2-methyl and 6 - methyl - 4 - (organothiomethyl)testosterone derivatives, and the 9α-fluoro-11β-hydroxy-17α-methyl-testosterone derivatives possess anabolic and androgenic properties. Again the 4-(organothiomethyl)progesterone and 16α-methylprogesterone derivatives possess progestational activity, which is also shown by the 4-(organothiomethyl) derivatives of 17α-acetoxyprogesterone, 17α-acetoxy-6α-methylprogesterone, 17α-acetoxy-16-methyleneprogesterone.

The invention provides the following specific 4-organothiomethyl-3-oxo-Δ⁴-steroids:

4-phenylthiomethyltestosterone and acetate.
4-benzylthiomethyltestosterone.
4-ethylthiomethyltestosterone.
4-n-butylthiomethyltestosterone.
4-(β-hydroxyethyl)thiomethyltestosterone.
4-cyclohexylthiomethyltestosterone.
4-p-tolylthiomethyltestosterone.
2α-methyl-4-phenylthiomethyltestosterone and acetate.
6α-methyl-4-phenylthiomethyltestosterone.
4-phenylthiomethyl-19-nortestosterone.
4-phenylthiomethylprogesterone.
17α-acetoxy-4-phenylthiomethylprogesterone.
16α-methyl-4-phenylthiomethylprogesterone.
17α-acetoxy-6α-methyl-4-phenylthiomethylprogesterone.
4-phenylthiomethylpregna-4:9(11)-diene-3:20-dione.
17α-caproyloxy-4-(phenylthiomethyl)progesterone which is of value on account of its progestational activity.
11α-hydroxy-4-(phenylthiomethyl)testosterone which is of value as an intermediate in the preparation of 4-methyl-11α-hydroxytestosterone which has anabolic/androgenic properties.
4-phenylthiomethyladrenosterone which is of value as an intermediate in the preparation of 4-methyladrenosterone.
9α - fluoro - 11β,17β - dihydroxy - 17α - methyl - 4 - phenylthiomethylandrost-4-en-3-one which is of value on account of its anabolic/androgenic properties.
17α - acetoxy - 16 - methylene - 4 - phenylthiomethylpregn-4-en-3,20-dione which is of value on account of its progestational activity.

According to the present invention there is provided a method for the preparation of a 4-organothiomethyl-3-oxo-Δ⁴-steroid, which method comprises condensing the corresponding 3-oxo-Δ⁴-steroid with formaldehyde or a polymer thereof and a thiol in the presence of a basic catalyst.

The method of the invention is a general one in the steroid field and may be applied to 3-oxo-Δ⁴-steroids of the androstane, pregnane, cholane, cholestane, ergostane, stigmastane and spirostane series and their 19-nor and D-homo analogues. In general, the following groups do not interfere with the process of the reaction:

Hydroxy (or esterified hydroxyl) or alkoxy groups, in particular at positions C-6, 11, 12, 14, 16, 17, 20 and 21.
Oxo groups, in particular at positions C-11, 12, 17 and 20.
Carboxyl groups (or esterified carboxyl groups), in particular at C-21 and C-24.
Alkyl groups containing up to five carbon atoms, in particular methyl groups at C-1, 2, 6, 7, 11, 14, 16 and 17 and ethyl groups at C-17.
Alkynyl groups containing up to five carbon atoms.
Vinyl groups, in particular at position C-17.
Methylene groups and in particular methylene groups at C-16.
Ketal groups, in particular ethylenedioxy or trimethylenedioxy at positions C-12, 17 and 20, bismethylenedioxy at C-17:20:20:21 or dialkylmethylenedioxy at positions such as C-16:17.
Fluoro groups, in particular at position 9.
Ethylenic linkages, in particular at positions such as 6:7, 7:8, 9:11, 11:12, 14:15, 17:20 and 22:23 also will not in general interfere with the process of the reaction.

The basic catalyst may be a tertiary aliphatic amine such as triethylamine, trimethylamine, tri-n-propylamine or N-methylpiperidine or a hydroxytertiary amine such as triethanolamine.

In carrying out the process of the present invention the 3-oxo-Δ⁴-steroid, formaldehyde and the thiol are heated together under reflux or in a sealed vessel, preferably in a solvent, at a temperature which is preferably between 40° and 150° C., and conveniently at the boiling point of the mixture when employing the preferred solvents. The preferred solvent is ethanol, but other lower alkanols, such as methanol, propan-1-ol, propan-2-ol or any isomer of butanol or pentanol, may be employed. The solvent may also be a diol, such as ethanediol or propanediol, or a hydroxytertiary amine such as triethanolamine, which latter combines the functions of solvent and catalyst.

The formaldehyde is conveniently added in the form of its 40% aqueous solution ("formalin") or as a polymer such as paraformaldehyde. The term "formaldehyde" is used hereinafter in the specification and in the claims in a generic sense, inclusive of the compound and its polymers. In theory 1 molar proportion of formaldehyde is sufficient, but the amount employed is not critical, and in practice it is advisable to use an excess, such as 2 molar proportions, of formaldehyde, particularly if the reaction is performed in a vessel from which formaldehyde may be lost to the atmosphere in the course of the heating. The use of even a large excess of formaldehyde is in general not detrimental to the reaction.

The structure of the thiol is not critical and the thiol employed in the process may be any one of a wide variety of compounds containing one or more thiol (—SH) groups, subject to the limitation, as will be evident to those skilled in the art, that the compound does not contain in its structure another group, or groups, capable either of inhibiting the participation of the thiol group or groups in the condensation reaction, or of otherwise interfering with the course of the reaction. Thus the thiol may, in general, be a compound in which one or more thiol groups are attached to an organic residue which may be aliphatic, alicyclic, heterocyclic or aromatic, or may combine two or more of these characteristics. More specifically the thiol may be an alkane thiol or an alkene thiol containing in each case up to 12 carbon atoms, or a substituted alkane or alkene thiol such, for example, as 2-hydroxyethanenthiol or a hydroxy or dihydroxy-propane-thiol, or 2-mercaptoethyl ether or 2-mercaptoethyl sulphide or a carboxy-alkanethiol, such as propionic acid β-thiol, or a cycloalkane or cycloalkene-thiol, such as cyclohexane-thiol, or a heterocyclic derivative such as furfuryl mercaptan or a pyridine thiol, or an aralkyl thiol such as toluene-ω-thiol, or a derivative thereof such as p-chlorotoluene-ω-thiol, or an aromatic thiol such as thiophenol or o-, m- or p-toluenethiol or a naphthalenethiol such as naphthalene-β-thiol, or a di-thiol such as an alkanedithiol containing up to 10 carbon atoms or an aryl dithiol such as toluene-3:4-dithiol. The preferred thiols are thiophenol and p-toluene thiol.

The formaldehyde and the thiol, as defined above, may, if so desired, be caused to react together to form the corresponding alkyl(aryl, etc.)-thiomethanol (R.S.CH$_2$OH)

prior to condensation with the steroid. This thiomethanol may then be used in place of the formaldehyde and thiol, when it will condense with the 3-oxo-Δ$^4$-steroid in presence of a basic catalyst to give the same 4-alkyl(aryl, etc.)-thiomethyl derivative as would the formaldehyde and thiol if used wihout prior interaction.

The quantity of thiol employed may be 1 molar proportion, or preferably somewhat more in order to ensure complete reaction of the steroid.

The reaction may be advantageously carried out in an inert atmosphere such as nitrogen, especially when only 1 molar proportion of thiol is used, in order to avoid slow atmospheric oxidation of the thiol to the corresponding dialkyl (or diaryl) disulphide which has been observed to occur in some cases.

The 4-organothiomethyl compound may be isolated from the reaction mixture by any convenient process, such as, for example, by steam distillation to remove the solvent, catalyst and excess of formaldehyde and thiol, followed by extraction of the residue with a suitable solvent, or by pouring the reaction mixture into an aqueous solution of sodium or potassium hydroxide to dissolve any unreacted thiol, and filtration if the product is precipitated as a solid, or extraction with an organic solvent such as ether, benzene or chloroform. The resulting 4-organothiomethyl derivatives may usually be obtained as crystalline solids from suitable solvents, and are generally characterised by absorption maxima in the region of 245 to 254 mμ, depending on the particular steroid and thiol from which they are derived. In the case of compounds having a 6:7 ethylenic linkage conjugated with the 3-oxo-Δ$^4$-system (4:6-dien-3-ones), the characteristic ultraviolet absorption maxima are in the region of 290 mμ.

Following is a description by way of example of methods of carrying the invention into effect.

*Example 1*

Testosterone (5.76 g.) thiophenol (4.2 ml.), formaldehyde (40% aqueous solution; 3.3 ml.), triethylamine (4 ml.) and ethanol (10 ml.) were heated together under reflux for 48 hours. The mixture was then poured into water (300 ml.), containing potassium hydroxide (6 g.), the product was extracted with ether, and the ether extract was washed with water, dried over sodium sulphate and evaporated. The residue, after crystallisation from aqueous methanol, gave 4-phenylthiomethyl-testosterone, needles, M.P. 142 to 144° C., [α]$_D^{24}$ +32° (c., 0.37 in chloroform), λ$_{max.}$ 251 mμ (ε=18,100) in ethanol, γ$_{max.}$ 3606, 1665 and 1600 cm.$^{-1}$ in chloroform.

The foregoing compound (4 g.) in anhydrous pyridine (20 ml.) and acetic anhydride (10 ml.) was heated at 50° C. for 2 hours, and the mixture was poured into water. The product was extracted with ether, and the ether extract was washed with water, dilute hydrochloric acid, water, sodium bicarbonate solution and water until neutral, dried over sodium sulphate and evaporated.

4-phenylthiomethyltestosterone acetate separated from hexane in prisms, M.P. 116.5 to 117° C., [α]$_D^{22}$ −6° (c., 0.10 in chloroform), λ$_{max.}$ 251.5 mμ (ε=18,960) in ethanol.

The following esters of 4-phenylthiomethyltestosterone were prepared in similar manner:

n-Butyrate, n-valerate, iso-valerate (pentanoate), n-caproate (hexanoate), n-heptylate (heptanoate), n-caprylate (octanoate), n-oenanthate (nonanoate), n-caprate (decanoate), phenylacetate, β-phenylpropionate, γ-phenylbutyrate, phenoxyacetate, p-chlorophenoxyacetate. Propionate, plates from methanol, M.P. 105 to 106° C., [α]$_D^{22}$ +94° (c., 0.48 in chloroform).

*Example 2*

Testosterone (5.76 g.) thiophenol (4.2 ml.), paraformaldehyde (1.3 g.), triethylamine (4 ml.) and n-amyl alcohol (20 ml.) were heated under reflux in nitrogen for 8 hours. The product was isolated as described in Example 1, giving 4-phenylthiomethyltestosterone, M.P. 142 to 144° C.

*Example 3*

N-methylpiperidine was substituted for triethylamine in Example 2. After being heated for 8 hours, the mixture was distilled in steam for 3 hours, and the residue was cooled and extracted with ether. Evaporation of the ether and purification from aqueous methanol gave 4-phenylthiomethyltestosterone, M.P. 142 to 144° C.

*Example 4*

Testosterone (5 g.), thiophenol (4 ml.), formaldehyde (40% aqueous solution; 5 ml.) and triethanolamine (10 ml.) were heated under reflux for 16 hours. The product, isolated as described in Example 1, was 4-phenylthiomethyltestosterone, M.P. 142 to 144° C.

*Example 5*

Testosterone (5.76 g.), toluene-ω-thiol (2.6 ml.), formaldehyde (40% aqueous solution; 1.7 ml.), triethylamine (2 ml.) and ethanol (10 ml.) were heated under reflux for 48 hours, then the product was isolated as described in Example 1, and purified from ether, followed by acetone/hexane (1:2), giving 4-benzyl-thiomethyltestosterone in flakes, M.P. 113 to 116° C., [α]$_D^{24}$ +98° (c., 0.27 in chloroform), λ$_{max.}$ 245 mμ (ε=15,200) in ethanol, γ$_{max.}$ 3630, 1678 and 1602 cm.$^{-1}$ in carbon tetrachloride.

*Example 6*

Testosterone (5.76 g.) ethane thiol (5 ml.), formaldehyde (40% aqueous solution; 3 ml.), triethylamine (3 ml.) and ethanol (10 ml.) were heated under reflux under an excess pressure of 10 cm. of mercury to prevent loss of the volatile thiol. After 160 hours the product was isolated as described in Example 1. Purification from ether gave 4-ethylthiomethyltestosterone as a flocculent mass, M.P. 89 to 94° C., λ$_{max.}$ 246.5 mμ (ε=13,200) in ethanol, [α]$_D^{22}$ +93° (c., 0.22 in chloroform).

*Example 7*

Testosterone (5.76 g.), butane-1-thiol (3.6 ml.), formaldehyde (40% aqueous solution; 3.4 ml.), triethylamine (2 ml.) and ethanol (10 ml.) were heated under reflux for 48 hours, then the product was isolated as described in Example 1, and purified from acetone/hexane (1:4).

4-n-butylthiomethyltestosterone formed fine needles or clusters of prisms, M.P. 109 to 110° C., [α]$_D^{24}$ +108 (c., 0.24 in chloroform), λ$_{max.}$ 246.5 mμ (ε=14,220) in ethanol, γ$_{max.}$ 3624, 3445, 1674 and 1599 cm.$^{-1}$ in chloroform.

*Example 8*

β-hydroxyethane thiol (3.0 ml.) was substituted for butane-1-thiol in Example 7, the product being 4-(β-hydroxyethyl)thiomethyltestosterone, which separated from aqueous methanol (70%) in needles, M.P. 109 to 111°

C., $[\alpha]_D^{25}$ +86° (c., 0.27 in chloroform), $\lambda_{max.}$ 249 mu ($\epsilon$=13,580) in ethanol.

*Example 9*

Testosterone (5.76 g.), ethane dithiol (0.92 ml.), formaldehyde (40% aqueous solution; 3 ml.), triethylamine (3 ml.) and ethanol (10 ml.) were heated under reflux for 60 hours, then the product was isolated as described in Example 1, and was obtained as a pale yellow oil, $\lambda_{max.}$ 250 mu, which was sufficiently pure for conversion into 4-methyltestosterone, or could be separated by chromatography on alumina into 4-($\beta$-mercaptoethyl)-thiomethyltestosterone and 1:2 - di - (17$\beta$ - hydroxy - 3 - oxoandrost-4-en-4-ylmethylthio)ethane.

*Example 10*

Toluene-3:4-dithiol (3.1 ml.) was substituted for ethane dithiol in Example 9. The product was obtained as a granular solid suitable for conversion into 4-methyltestosterone by treatment with Raney nickel.

*Example 11*

2$\alpha$-methyltestosterone (Ringold and Rosenkranz, J. Org. Chem. 1956, 21, 1333) was treated by the process of Example 1, and gave 2$\alpha$-methyl-4-phenylthiomethyltestosterone in fine needles, M.P. 119 to 121° C., from aqueous methanol (80%), $[\alpha]_D^{22}$ +108° (c., 0.14 in chloroform), $\lambda_{max.}$ 251 mu ($\epsilon$=21,060) in ethanol.

2$\alpha$-methyl-4-phenylthiomethyltestosterone acetate was obtained by treating the last compound with acetic anhydride/pyridine for $\frac{1}{2}$ hour at 100° C. Purification from aqueous methanol gave the acetate in flakes, M.P. 143 to 146° C., $[\alpha]_D^{24}$ +107° (c., 0.26 in chloroform), $\lambda_{max.}$ 251 mu ($\epsilon$=16,250) in ethanol.

The following other esters of 2$\alpha$-methyl-4-phenylthiomethyltestosterone were prepared in similar manner:

Propionate, n-butyrate, n-valerate, iso-valerate (pentanoate), n-caproate (hexanoate), n-heptylate (heptanoate), n-caprylate (octanoate), n-oenanthate (nonanoate), n-caprate (decanoate), phenylacetate, $\beta$-phenylpropionate, $\gamma$-phenylbutyrate, phenoxyacetate, p-chlorophenoxyacetate.

*Example 12*

17$\alpha$-methyltestosterone (5 g.), thiophenol (4 ml.), formaldehyde (40% aqueous solution; 5 ml.), triethylamine (4 ml.) and ethanol (10 ml.) were heated under reflux for 48 hours. The product was isolated as described in Example 1 and purified from acetone/hexane (1:4), then from aqueous methanol, when it formed solvated needles, M.P. 104–110° C., which after drying in vacuo at 50° C. gave 17$\alpha$-methyl-4-phenylthiomethyltestosterone, M.P. 136 to 138° C., $[\alpha]_D^{22}$ +5° (c., 0.10 in chloroform), $\lambda_{max.}$ 252 mu ($\epsilon$=18,000) in ethanol, $\gamma_{max.}$ 3610 and 1673 cm.$^{-1}$ in chloroform. In the same way 17$\alpha$-ethyl-4-phenylthiomethyltestosterone was prepared from 17$\alpha$-ethyltestosterone.

*Example 13*

Androst-4-ene-3:17-dione (5 g.), thiophenol (4 ml.), formaldehyde (40% aqueous solution; 3 ml.) triethylamine (3 ml.) and ethanol (10 ml.) was heated under reflux for 64 hours and then the product was isolated as described in Example 1. Purification from acetone/hexane (1:1) or from 80% aqueous methanol gave 4-phenylthiomethylandrost-4-ene-3:17-dione in needles, M.P. 136 to 138° C., $\lambda_{max.}$ 252 mu ($\epsilon$=18,000) in ethanol, $[\alpha]_D^{22}$ +150° (c., 0.18 in chloroform).

*Example 14*

6$\alpha$-methylandrost-4-ene-3:17-dione (Ackroyd et al., J. Chem. Soc., 1957, 4099) treated as described in Example 13, gave 6$\alpha$-methyl - 4 - phenylthiomethylandrost-4-ene-3:17-dione, $\lambda_{max.}$ 253.5 mu ($\epsilon$=16,500) in ethanol.

*Example 15*

Progesterone (12.56 g.), thiophenol (9.6 ml.), formaldehyde (40% aqueous solution; 6.6 ml.), triethylamine (8 ml.) and ethanol (40 ml.) were heated under reflux in nitrogen for 48 hours. Extraction as described in Example 1, and purification from acetone/hexane (1:2), gave 4-phenylthiomethylprogesterone in needles, M.P. 98 to 100° C., $[\alpha]_D^{25}$ +175° (c., 0.28 in chloroform), $\lambda_{max.}$ 252 mu ($\epsilon$=18,960) in ethanol, $\gamma_{max.}$ 1707, 1674 and 1600 cm.$^{-1}$ in chloroform.

*Example 16*

Pregna-4:9(11)-diene-3:20-dione (Herzog et al., J. Amer. Chem. Soc., 1954, 76, 930) (4 g.), thiophenol (3 ml.), formaldehyde (40% aqueous solution; 3 ml.), triethylamine (3 ml.) and ethanol (10 ml.) were heated under reflux for 64 hours, then the product was isolated as described in Example 1, to give 4-phenylthiomethylpregna-4:9(11)-diene-3:20-dione, $\lambda_{max.}$ 251.5 mu ($\epsilon$=17,900) in ethanol.

*Example 17*

17$\alpha$-acetoxyprogesterone (Ringold et al., J. Amer. Chem. Soc., 1956, 78, 816) (1.63 g.), thiophenol (1.25 ml.), formaldehyde (40% aqueous solution; 0.9 ml.), triethylamine (1 ml.) and ethanol (20 ml.) were heated under reflux for 44 hours, then poured into water and potassium hydroxide (2 g.) the product was extracted with chloroform and the extract was washed, dried and evaporated. Crystallisation from acetone/hexane (1:1) gave 17$\alpha$ - acetoxy - 4 - phenylthiomethylprogesterone in needles (M.P. 187 to 190° C., $[\alpha]_D^{24}$ +78° (c., 0.14 in chloroform), $\lambda_{max.}$ 251 mu. ($\epsilon$=18,900) in ethanol, $\gamma_{max.}$ 1739, 1717, 1674 and 1250 cm.$^{-1}$ in carbon disulphide.

*Example 18*

17$\alpha$:20:20:21 - bismethylenedioxypregn - 4 - ene - 3:11-dione (Beyer et al., J. Amer. Chem. Soc., 1958, 80, 1517) (5 g.), thiophenol (4 ml.), formaldehyde (40% aqueous solution; 3 ml.), triethylamine (3 ml.) and ethanol (10 ml.) were heated together under reflux for 60 hours. The solid material which separated was collected and purified from ethanol/chloroform (3:1), to give 17$\alpha$:20:20:21-bismethylenedioxy - 4 - phenylthiomethylpregn - 4 - ene-3:11-dione in needles, M.P. 181 to 183° C., $[\alpha]_D^{21}$ +61° (c., 0.17 in chloroform), $\lambda_{max.}$ 251.5 mu ($\epsilon$=20,145) in ethanol, $\gamma_{max.}$ 1706, 1673 and 1601 cm.$^{-1}$ in carbon tetrachloride.

Removal of the protecting bismethylenedioxy group by treating the foregoing compound with 60% aqueous acetic acid under nitrogen for 8 hours at 100° C. gave 4-phenylthiomethylcortisone.

*Example 19*

25D-spirost-4-en-3-one ("diosgenone") (10 g.), thiophenol (8 ml.), formaldehyde (40% aqueous solution; 7 ml.), triethylamine (7 ml.) and ethanol (25 ml.) were heated under reflux for 70 hours, then the product was isolated as described in Example 1. Purification from chloroform/ethanol (1:3) gave 4-phenylthiomethyl-25D-spirost-4-en-3-one in flakes, M.P. 151 to 153° C., $[\alpha]_D^{22}$ +4° (c., 0.13 in chloroform), $\lambda_{max.}$ 252.5 mu ($\epsilon$=17,590) in ethanol.

*Example 20*

Testosterone (5 g.), methane thiol (4 ml.), formaldehyde (40% aqueous solution; 3 ml.), triethylamine (3 ml.) and ethanol (15 ml.) were heated in a sealed tube at 100° C. for 44 hours, then the product was isolated as in Example 1, giving 4-methylthiomethyltestosterone $\lambda_{max.}$ 246.5 mu ($\epsilon$=13,600) in methanol.

*Example 21* n-Decane thiol (5 ml.) was substituted for butane thiol in Example 7 heating being continued for 96 hours, when the product was 4-n-decylthiomethyltestosterone, $\lambda_{max}$. 246.5 mu ($\epsilon$=13,040) in ethanol.

Example 22 n-Dodecane thiol (5 ml.) was substituted for butane thiol in Example 21, when the product was 4-n-dodecylthiomethyltestosterone, $\lambda_{max}$. 246 mu ($\epsilon$=12,840) in ethanol.

Example 23

Cyclohexane thiol (4 ml.) was substituted for butane thiol in Example 7, when the product was 4-cyclohexylthiomethyltestosterone which separated from aqueous methanol (80%) in silky needles, M.P. 138 to 141° C., $\lambda_{max}$. 249 mu ($\epsilon$=13,800) in ethanol [$\alpha$]$_D^{22}$ +91° (c., 0.09 in chloroform).

Example 24

Toluene-p-thiol (4 g.) was substituted for butane thiol in Example 7, when the product was 4-p-tolylthiomethyltestosterone, which separated from aqueous methanol (80%) or from acetone/hexane (1:1) as a flocculent mass, M.P. 118 to 122° C., $\lambda_{max}$. 251 mu ($\epsilon$=16,900) in ethanol, [$\alpha$]$_D^{22}$ +87° (c., 0.82 in chloroform).

Example 25

Prop-2-ene-1-thiol(allylmercaptan) (5 ml.) was substituted for ethane thiol in Example 6, and heating continued for 96 hours, when the product was 4-allylthiomethyltestosterone.

Example 26

Furfuryl mercaptan (4 ml.) was substituted for thiophenol in Example 1, when the product was 4-furfurylthiomethyltestosterone soft needles from ether/hexane, M.P. about 70° C. [$\alpha$]$_D^{22}$ +92° (c., 0.20 in chloroform), $\lambda_{max}$. 226 mu ($\epsilon$=13,930) and 246.5 mu ($\epsilon$=13,-225) in ethanol.

Example 27

Naphthalene-2-thiol (6 g.) was substituted for thiophenol in Example 1, when the product was 4-(naphthalene-2'-thiomethyl)-testosterone.

Example 28 n-Decane-1:10-dithiol (2.5 ml.) was substituted for ethane dithiol in Example 9, when the product was a mixture containing 4-(10-mercapto-n-decylthiomethyl)-testosterone and 1:10-di-(17$\beta$-hydroxy-3-oxoandrost-4-en-4-ylmethylthio)-n-decane. This mixture was suitable for conversion into 4-methyltestosterone, or could be resolved into its components by chromatography on alumina if so desired.

Example 29

17$\beta$-hydroxyandrosta-4:6-dien-3-one (Wettstein, Helv. Chim. Acta, 1940, 23, 388) (5 g.), thiophenol (5 ml.), formaldehyde (40% aqueous solution; 5 ml.), triethylamine (5 ml.) and ethanol (10 ml.) were heated under reflux for 72 hours. Isolation of the product as in Example 1, and purification from acetone/hexane (1:2) gave 17$\beta$-hydroxy-4-phenylthiomethylandrosta-4:6-dien-3-one, in microcrystals, M.P. 146 to 149° C., $\lambda_{max}$. 291 mu ($\epsilon$=19,245) in ethanol.

Example 30

6$\alpha$-methyltestosterone (Ackroyd et al., J. Chem. Soc., 1957, 4099) (14.22 g.), thiophenol (10 ml.), triethylamine (9.4 ml.), formaldehyde (40% aqueous solution; 8.4 ml.), and ethanol (24 ml.) were heated together under reflux for 88 hours, then the mixture was poured into water (350 ml.) containing potassium hydroxide (6.6 g.). The product was isolated by extraction with ether and purified by chromatography onto alumina (400 g.). The benzene/light petroleum (B.P. 40 to 60° C.) (1:1 and 3:1) eluates gave material which was purified from benzene/light petroleum (B.P. 40 to 60° C.) to give 6$\alpha$-methyl-4-phenylthiomethyltestosterone as silky needles, M.P. 111 to 112° C. [$\alpha$]$_D^{24}$ −45° (c., 1.16 in chloroform), $\lambda_{max}$. 253 mu ($\epsilon$=16,390) in ethanol.

The 17-acetate, prepared by warming the foregoing compound with acetic anhydride and pyridine (1:1) in the usual manner, was a gum, $\lambda_{max}$. 252.5 mu ($\epsilon$=16,580) in ethanol.

Example 31

Testosterone (3 g.), thiophenol (2.2 ml.), formaldehyde (40% aqueous solution; 2.0 ml.), trimethylamine (3 ml.) and methanol (10 ml.) were heated in a sealed tube at 80° C. for 56 hours, then the product was isolated as in Example 1, giving 4-phenylthiomethyltestosterone, M.P. 140 to 144° C.

Example 32

D-homotestosterone (Goldberg et al., Helv. Chim. Acta, 1947, 30, 1441) (4 g.), treated according to the process of Example 1, gave 4-phenylthiomethyl-D-homotestosterone, $\lambda_{max}$. 251 mu.

Example 33

6-methylandrosta-4:6-diene-3:17-dione, treated as in Example 13, gave a product from which 6-methyl-4-phenyl-thiomethylandrosta-4:6-diene-3:17-dione was separated by chromatography on alumina.

Example 34

17$\alpha$-vinyltestosterone (Ruzicka and Muller, Helv. Chim. Acta, 1939, 22, 755) (2.9 g.), thiophenol (2 ml.), formaldehyde (40% aqueous solution; 2 ml.), tri-n-propylamine (3 ml.) and ethane diol (10 ml.) were heated on the steam-bath for 56 hours, then the mixture was poured into water, and the product extracted with ether, which was washed with water, dilute hydrochloric acid, water, 5% sodium hydroxide solution, and water until neutral, dried and evaporated. The residue, in benzene/light petroleum (B.P. 40 to 60° C.) (1:1) was chromatographed on alumina (75 g.). The benzene/light petroleum eluates were rejected, then elution with benzene/ether mixtures gave 4-phenyl-thiomethyl-17$\alpha$-vinyltestosterone, fibrous crystals from aqueous methanol, M.P. 92 to 94° C., [$\alpha$]$_D^{25}$ +62° (c., 0.27 in chloroform, $\lambda_{max}$. 251.5 mu ($\epsilon$=17,070), in ethanol, $\gamma_{max}$. 3605, 1673 and 1638 cm.$^{-1}$ in carbon tetrachloride.

Example 35

Cholest-4-en-3-one (10 g.), thiophenol (8 ml.), formaldehyde (40% aqueous solution; 7 ml.), triethylamine (7 ml.) and ethanol (20 ml.) were heated under reflux for 60 hours, then the product was isolated as in Example 1, giving 4-phenylthiomethylcholest-4-en-3-one after chromatographic purification of the crude product.

Example 36

Stigmasta-4:22-dien-3-one (Jones et al., J. Chem. Soc., 1942, 391) treated as in Example 35 gave 4-phenylthiomethylstigmasta-4:22-dien-3-one after chromatographic purification of the crude product.

Example 37

Ergosta-4:7:22-trien-3-one (Heilbron et al., J. Chem. Soc., 1938, 869) (6.15 g.), thiophenol (5 ml.), formaldehyde (40% aqueous solution; 4 ml.), triethylamine (4 ml.) and ethanol (15 ml.) were heated under reflux for 54 hours, when the mixture was steam distilled for 3 hours, to remove unwanted materials. Chromatography of the residual oil gave 4-phenylthiomethylergosta-4:7:22-trien-3-one, $\lambda_{max}$. 251 to 253 mu ($\epsilon$=18,400) in ethanol.

Example 38

Methyl 3-oxochol-4-en-24-oate (Dane et al., Z. Physiol. Chem., 1936, 145, 80) was treated as in the foregoing Example 37, the crude product being treated with ethereal diazomethane prior to chromatography in order to reesterify any free 24-oic acid formed in the course of the reaction. The product was methyl-3-oxo-4-phenylthiomethylchol-4-en-24-oate, $\lambda_{max.}$ 252 mu ($\epsilon$=18,340) in ethanol.

Example 39

7β-methyltestosterone (Zderic et al., J. Amer. Chem. Soc., 1959, 81, 432) treated according to the process of Example 1 gave 7β-methyl-4-phenylthiomethyltestosterone.

Example 40

17α-methyltestosterone (5 g.), toluene-p-thiol (4 g.), formaldehyde (40% aqueous solution; 3 ml.) triethylamine (3 ml.) and ethanol (10 ml.) were heated together under reflux for 40 hours, then the product was isolated as in Example 1, and purified from ether/light petroleum (B.P. 40 to 60° C.) (1:3) followed by aqueous methanol (80%) to give 17α-methyl-4-(p-tolylthiomethyl)-testosterone as plates, M.P. 143 to 144° C., $[\alpha]_D^{28}$ +92° (c., 0.6 in chloroform), $\lambda_{max.}$ 227 mu ($\epsilon$=13,450) and 253 mu ($\epsilon$=16,820) in ethanol.

Example 41

17α-acetoxy-6α-methylprogesterone (Babcock et al., J. Amer. Chem. Soc., 1958, 80, 2904) (2.65 g.) thiophenol (2 ml.), formaldehyde (40% aqueous solution; 2 ml.), triethylamine (2 ml.) and ethanol (6 ml.) were heated under reflux for 60 hours, then the product was isolated as in Example 17. 17α-acetoxy-6α-methyl-4-phenylthiomethylprogesterone separated from acetone/hexane (1:1) in prisms, M.P. 209 to 212° C., $[\alpha]_D^{24}$ +32° (c., 0.85 in chloroform), $\lambda_{max.}$ 252 mu ($\epsilon$=21,000) in ethanol.

Example 42

16α-methylprogresterone (Marker and Crooks, J. Amer. Chem. Soc., 1942, 64, 1281) treated according to the process of Example 16 gave 16α-methyl-4-phenylthiomethylprogesterone, $\lambda_{max.}$ 251 mu ($\epsilon$=18,320) in ethanol.

Example 43

16α - 17α - dimethylmethylenedioxyprogesterone (16α, 17α - isopropylidenedioxyprogesterone, Cooley et al., J. Chem. Soc., 1955, 4373) (440 mg.), thiophenol (0.5 ml.), formaldehyde (40% aqueous solution; 0.5 ml.), triethylamine (1 ml.) and ethanol (3 ml.) were heated under reflux for 60 hours, then the product was isolated as in Example 1 to give 16α:17α-dimethylmethylenedioxy-4-phenylthiomethylprogesterone, $\lambda_{max.}$ 251.5 mu ($\epsilon$=18,700) in ethanol.

Example 44

Pregna-4:11-diene-3:20-dione (Hegner and Reichstein, Helv. Chim. Acta, 1943, 26, 715) treated according to the process of Example 15 gave 4-phenylthiomethylpregna-4:11-diene-3:20-dione, $\lambda_{max.}$ 252 mu ($\epsilon$=18,540) in ethanol.

Example 45

19-nortestosterone (Wilds and Nelson, J. Amer. Chem. Soc., 1953, 75, 5366) treated according to the process of Example 1, gave 4-phenylthiomethyl-19-nortestosterone which separated from aqueous methanol in prisms, M.P. 140 to 142° C., $[\alpha]_D^{22}$ +87° (c., 1.10 in chloroform), $\lambda_{max.}$ 251 mu ($\epsilon$=19,080) in ethanol.

Example 46

1-methyl-19-nortestosterone (Ringold et al., J. Amer. Chem. Soc., 1956, 78, 2477) treated according to the process of Example 1, gave 1-methyl-4-phenylthiomethyl-19-nortestosterone, $\lambda_{max.}$ 253.5 mu ($\epsilon$=16,410) in ethanol.

Example 47

Testosterone (5 g.), phenylthiomethanol (5 ml.), triethylamine (3 ml.) and ethanol (10 ml.) were heated under reflux for 52 hours, then the product was isolated as in Example 1, giving 4-phenylthiomethyltestosterone, M.P. 142 to 144° C.

Example 48

9α-fluorocortisone (Fried and Sabo, J. Amer. Chem. Soc., 1954, 76, 1455) (5 g.), chloroform (150 ml.), 40% aqueous formaldehyde (40 ml.) and concentrated hydrochloric acid (40 ml.) were stirred together for 48 hours, then the chloroform was washed, dried and evaporated, giving 9α-fluoro-17α:20:20:21-bis-methylenedioxy-pregn-4-ene-3:11-dione.

The foregoing compound was treated as in Example 18, giving 9α-fluoro-17α:20:20:21-bis-methylenedioxy-4-phenylthiomethylpregn-4-ene-3:11-dione.

Removal of the protecting bis-methylenedioxy group by treating the foregoing compound with 60% aqueous acetic acid at 100° C. for 8 hours gave 9α-fluoro-4-phenylthiomethylcortisone.

Example 49

14α-methylcortisone (prepared by mild alkaline hydrolysis of the 21-acetate) treated as in Example 48 gave the 17α:20:20:21 - bis - methylenedioxy - derivative.

The foregoing compound was converted into 14α-methyl - 17α:20:20:21 - bis - methylenedioxy - 4 - phenylthiomethylpregn-4-ene-3:11-dione, which on removal of the bis-methylenedioxy group as in the previous example gave 14α-methyl-4-phenylthiomethylcortisone.

Example 50

20ξ-hydroxypregn-4-en-3-one (Turner and Voitle, J. Amer. Chem. Soc., 1951, 73, 2283) treated as in Example 1, gave 20ξ - hydroxy - 4 - phenylthiomethylpregn - 4 - en-3-one, $\lambda_{max}$ 251 mu (18,960) in ethanol.

Example 51

21-hydroxypregna-4:17(20)-dien-3-one (Patel et al., J. Chem. Soc., 1952, 161) treated as in Example 1, gave 21-hydroxy - 4 - phenylthiomethylpregna - 4:17(20) - dien-3-one.

Example 52

3-oxopregna-4:17(20)-dien-21-oic acid (prepared by hydrolsis of the ethyl ester, Patel et al., J. Chem. Soc., 1952, 161) treated as in Example 1, gave 3-oxo-4-phenylthiomethylpregna-4:17(20)-dien-21-oic acid.

Example 53

11β - hydroxy - 17α:20:20:21-bismethylenedioxypregn-4-en-3-one (Beyler et al., J. Amer. Chem. Soc., 1958, 80, 1517) treated as in Example 37 gave 11β-hydroxy-17α: 20:20:21 - bismethylenedioxy - 4 - phenylthiomethylpregn-4-en-3-one, $\lambda_{max.}$ 252.5 mu ($\epsilon$=19,000) in ethanol.

Example 54

14α-hydroxyprogesterone (Schubert et al., Ber., 1958, 91, 2549) treated as in Example 16 gave 14α-hydroxy-4-phenylthiomethylprogesterone.

Example 55

17α:21 - dihydroxypregna - 4:14 - diene - 3:11:20 - trione (Agnello et al., J. Amer. Chem. Soc., 1955, 77, 4684) treated as in Example 48 gave first the 17α:20:20:21-bis-methylenedioxy derivative, which was then transformed into 17α:20:20:21-bis-methylenedioxy-4-phenylthiomethylpregna-4:14-diene-3:11-dione.

Example 56

11β-hydroxy-11α-methyltestosterone (Ringold et al., Tetrahedron, 1958, 2, 164) treated as in Example 1 gave 11β-hydroxy-11α-methyl-4-phenylthiomethyltestosterone.

Example 57

20:20-ethylenedioxypregn-4-en-3-one (Gut, J. Org. Chem., 1956, 21, 1327) treated as in Example 16 gave 20:20-ethylenedioxy-4-phenylthiomethylpregn-4-en-3-one.

Example 58

17β - hydroxy - 6α - methyl - 17α - (prop - 1' - ynyl)-androst-4-en-3-one (6α:21-dimethyl-ethisterone) (Barton et al., J. Chem. Soc., 1959, 1957) treated according to the process of Example 1 gave, after chromatographic purification, 17β-hydroxy-6α-methyl-4-phenylthiomethyl-17α-(prop-1'-ynyl)-androst-4-en-3-one, $\lambda_{max.}$ 252 mu ($\epsilon=18,800$) in ethanol, $\lambda_{max.}$ 3612, 3065, 2231 and 1675 cm.$^{-1}$ in carbon tetrachloride.

Example 59

17α-hydroxyprogesterone caproate (Batres et al., J. Org. Chem., 1956, 21, 240) (3.1 g.), thiophenol (2.5 ml.), triethylamine (2.0 ml.), formaldehyde (40% aqueous solution; 2.0 ml.) and ethanol (10 ml.) were heated under reflux for 32 hours, then the mixture was poured into dilute potassium hydroxide solution and the product extracted with ether. Chromatography on alumina (80 g.) gave 17α-caproyloxy-4-phenylthiomethylprogesterone as a syrup, $\lambda_{max.}$ 252 mu ($\epsilon=19,040$) in ethanol.

Example 60

16α-hydroxytestosterone (Adams et al., J. Chem. Soc., 1956, 297) treated according to the process of Example 1, gave 16α - hydroxy - 4 - phenylthiomethyltestosterone, $\lambda_{max.}$ 252.5 mu.

Example 61

16α,17α-benzylidenedioxyprogesterone [prepared by treating 16α,17α-dihydroxyprogesterone (Cooley et al., J. Chem Soc., 1955, 4373) with benzaldehyde in the presence of toluene-p-sulphonic acid] treated according to the process of Example 1, gave 16α,17α-benzylidenedioxy-4-phenylthiomethylprogesterone, $\lambda_{max.}$ 252 mu.

Example 62

25D-spirost-4-en-3-one, treated by the process of Example 19, but employing toluene-p-thiol in place of thiophenol, gave 4-(p-tolylthiomethyl)-25D-spirost-4-en-3-one, M.P. 164 to 166° C., $[\alpha]_D^{25}$ +9° (c., 0.53 in chloroform), $\lambda_{max.}$ 228 mu ($\epsilon=11,745$) and 254 mu ($\epsilon=15,860$) in ethanol.

Example 63

20,20 - ethylenedioxy - 17α - hydroxypregn - 4 - en - 3-one (Julian et al., J. Amer. Chem. Soc., 1950, 72, 367) (5 g.), toluene-p-thiol (4 g.), triethylamine (3 ml.), formaldehyde (40% aqueous solution; 3 ml.) and ethanol (20 ml.) were heated together under reflux for 50 hours, then the product was isolated as in Example 1, and purified from aqueous methanol (80%) to give 20,20-ethylenedioxy - 17α - hydroxy - 4 - (p - tolylthiomethyl)-pregn-4-en-3-one as flakes from aqueous methanol, M.P. 158 to 159° C., $[\alpha]_D^{22}$ +73° (c, 1.18 in chloroform), $\lambda_{max.}$ 227 mu ($\epsilon=11,390$) and 254.5 mu ($\epsilon=14,300$) in ethanol.

Removal of the protective ketal grouping from the foregoing compound by treatment with 90% aqueous acetic acid at room temperature for 20 hours, followed by precipitation by dilution with water, and purification from aqueous methanol, gave 17α-hydroxy-4-(p-tolylthiomethyl)-pregn-4-ene-3,20-dione, laths from aqueous methanol, M.P. 169 to 171° C., $[\alpha]_D^{17}$ +94° (c, 1.27 in chloroform) $\lambda_{max.}$ 227 mu ($\epsilon=14,510$) and 252.5 mu ($\epsilon=17,730$) in ethanol.

The following compounds were prepared in a similar way:

20,20 - ethylenedioxy - 17α - hydroxy - 4 - phenylthiomethylpregn-4-en-3-one, laths from aqueous methanol, M.P. 166 to 168° C., $[\alpha]_D^{23}$ +65° (c, 0.85 in chloroform), $\lambda_{max.}$ 251.5 mu ($\epsilon=18,325$) in ethanol.

17α - hydroxy - 4 - phenylthiomethylpregn - 4 - ene - 3,20-dione, needles from aqueous methanol, M.P. 128 to 130° C., $[\alpha]_D^{18}$ +94° (c., 0.95 in chloroform), $\lambda_{max.}$ 252 mu ($\epsilon=19,010$) in ethanol.

Example 64

17α - acetoxy - 16 - methylenepregn - 4 - ene - 3,20-dione treated according to the process of Example 1, followed by purification of the product from methylene chloride/methanol, then from aqueous acetone (80%) gave 17α - acetoxy - 16 - methylene - 4 - phenylthiomethylpregn-4-ene-3,20-dione as needles, M.P. 178 to 179° C., $[\alpha]_D^{31}$ −1° (c, 0.5 in chloroform), $\lambda_{max.}$ 251 mu ($\epsilon=18,620$) in ethanol.

Example 65

9α - fluoro - 11β,17β - dihydroxy - 17α - methylandrost-4-en-3-one (Herr et al., J. Amer. Chem. Soc., 1956, 78, 500) (1.7 g.), thiophenol (1.5 g.), formaldehyde (40% aqueous solution; 1.2 ml.), triethylamine (1.5 ml.) and ethanol (10 ml.) were heated together under reflux. The steroid dissolved gradually, giving a homogeneous solution after 12 hours. After 40 hours heating the mixture was allowed to cool, and was then cooled in ice for 6 hours. The crystalline solids which separated were purified from methanol to give 9α-fluoro-11β,17β-dihydroxy-17α-methyl-4-phenylthiomethylandrost-4-en-3-one in needles, M.P. 226 to 227° C., $[\alpha]_D^{23}$ +107° (c, 0.34 in chloroform), $\lambda_{max.}$ 250.5 mu ($\epsilon=12,880$) in ethanol, $\gamma_{max.}$ 3360, 1650, 1605, 1585 cm.$^{-1}$ in "Nujol."

Example 66

11α,17β-dihydroxyandrost-4-en-3-one (11α - hydroxytestosterone) (Bernstein et al., J. Org. Chem., 1953, 18, 1166) treated according to the process of Example 1, gave a product which was purified from acetone/hexane (1:4) and from methanol to give 11α,17β-dihydroxy-4-phenylthiomethylandrost-4-en-3-one as needles, M.P. 211 to 212° C., $[\alpha]_D^{21}$ +74° (c, 0.57 in chloroform), $\lambda_{max.}$ 253 mu ($\epsilon=17,875$) in ethanol, $\gamma_{max.}$ 3590, 1666, 1598 cm.$^{-1}$ in methylene chloride.

Example 67

Androst-4-ene-3,11,17-trione (andrenosterone) treated according to the process of Example 1 gave a gummy product which was purified by chromatography on alumina. The ether eluates afforded 4-phenylthiomethylandrost-4-ene-3,11,17-trione prisms from acetone/ether (1:6), M.P. 177 to 179° C., $\lambda_{max.}$ 250 mu ($\epsilon=17,400$) in ethanol $[\alpha]_D^{23}$ +240° (c, 0.93 in chloroform), $\gamma_{max.}$ 3063, 1749, 1713, 1675 and 1603 cm.$^{-1}$ in carbon tetrachloride.

Example 68

11β-hydroxytestosterone (Bernstein et al., J. Org. Chem. 1953, 18, 1166) treated according to the process of Example 1 gave a product which was purified by chromatography on alumina. The ether and ether/acetone (9:1) eluates afforded 11β-hydroxy-4-phenylthiomethyltestosterone, $\lambda_{max.}$ 253 mu ($\epsilon=18,040$) in ethanol.

Example 69

Ethyl-3-oxopregna-4,17(20)-dien-21-oate (Patel et al., J. Chem. Soc., 1952, 161) treated according to the process of Example 1, gave ethyl 3-oxo-4-phenylthiomethylpregna-4,17(20)-dien-21-oate, which after purification from acetone/hexane (1:10) was obtained as needles, M.P. 127 to 128° C., $\lambda_{max.}$ 220.5 mu ($\epsilon=25,850$) and 248.5 mu ($\epsilon=19,770$) in ethanol, $[\alpha]_D^{21}$ +115° (c, 0.46 in chloroform).

Example 70

11α-hydroxyprogesterone, treated according to the process of Example 1, gave an oily product which was purified by chromatography on alumina. The benzene/light petroleum (B.P. 40 to 60° C.) (3:2) and benzene eluates afforded material which after purification from acetone/hexane (1:2) gave 11α-hydroxy-4-phenylthiomethylprogesterone as needles, M.P. 137 to 139° C., $[\alpha]_D^{22}$ +129° (c, 0.31 in chloroform) $\lambda_{max.}$ 252.5 mu ($\epsilon=18,015$) in ethanol.

Example 71

Pregn-4-ene-3,11,20-trione, treated as in the foregoing example, gave 4-phenylthiomethylpregn-4-ene-3,11,20-trione, $\lambda_{max.}$ 251.5 mu.

Example 72

7,7-dimethylcholest-4-en-3-one (Julia et al., Compte Rend., 1959, 248, 2489) treated according to the process of Example 1 gave 7,7-dimethyl-4-phenylthiomethylcholest-4-en-3-one.

Example 73

21-acetoxy-20,20-ethylenedioxy-pregn-4-en-3-one (von Euw et al., Helv. Chim. Acta, 1955, 38, 1423), treated according to the process of Example 1, followed by re-acetylation of the crude product in pyridine/acetic anhydride at 50° C. for 2 hours, and chromatographic purification on alumina, gave 21-acetoxy-20,20-ethylenedioxy-4-phenylthiomethylpregn - 4 - en-3-one, $\lambda_{max.}$ 251.5 mu ($\epsilon$=20,150) in ethanol. $\gamma_{max.}$ 3049, 1751, 1676 and 1601 cm.$^{-1}$ in carbon tetrachloride, 1235, 1053, 734 and 685 cm.$^{-1}$ in carbon disulphide.

Example 74

Testosterone (5. g.), β-mercaptopropionic acid (5 ml.), formaldehyde (40% aqueous solution; 5 ml.), triethylamine (8 ml.) and ethanol (12 ml.) were heated together under reflux for 32 hours, then the mixture was poured into dilute hydrochloric acid and the products extracted with ether. The ether layer was washed with water, extracted with sodium bicarbonate solution, and the alkaline solution was acidified carefully with dilute hydrochloric acid and re-extracted with ether. The ether was then washed neutral, dried over sodium sulphate and evaporated, leaving crude 4-(β-carboxyethylthiomethyl)-testosterone as a glassy solid, $\lambda_{max.}$ 249 mu ($\epsilon$=12,440) in ethanol; $\gamma_{max.}$ 3400 to 3100, 1723, 1708, 1653 and 1593 cm.$^{-1}$ in "Nujol."

This material was suitable for desulphurisation to give 4-methyltestosterone, or could be converted by treatment with methanol containing 1% v./v. acetyl chloride, overnight at room temperature, pouring into dilute sodium bicarbonate solution, extracting with ether and purifying the product from ether/hexane (1:1) into 4-(β-methoxycarbonylethylthiomethyl)-testosterone, M.P. 96 to 97° C. (soft needles from aqueous methanol), $[\alpha]_D^{23}$ +79° (c., 0.41 in chloroform), $\lambda_{max.}$ 248.5 mu ($\epsilon$=11,780) in ethanol, $\gamma_{max.}$ 3608, 1742, 1671 and 1602 cm.$^{-1}$ in carbon tetrachloride.

Example 75

The procedure of Example 21 was repeated employing β-mercaptoethyl ethyl sulphide (β-ethylthioethanethiol) in place of n-decane thiol, when the product was 4-(β-ethylthioethylthiomethyl)-testosterone.

We claim:
1. A method for the preparation of a 4-organothiomethyl-3-oxo-$\Delta^4$-steroid which comprises condensing the corresponding 3-oxo-$\Delta^4$-steroid with formaldehyde and a thiol in the presence of a basic amine catalyst.
2. A method as claimed in claim 1 wherein the formaldehyde is condensed with the thiol and the resulting organothiomethanol is then condensed with the 3-oxo-$\Delta^4$-steroid in the presence of the basic amine catalyst.
3. A method as claimed in claim 1 wherein the basic amine catalyst is a tertiary aliphatic amine.
4. A method as claimed in claim 1 wherein the basic amine catalyst is a hydroxytertiary amine.
5. A method as claimed in claim 1 wherein the thiol is thiophenol.
6. A method as claimed in claim 1 wherein the thiol is p-toluene thiol.
7. A method as claimed in claim 1 wherein the thiol is butane thiol.
8. A method as claimed in claim 1 wherein the thiol is ethanethiol.
9. A method as claimed in claim 1 wherein the 3-oxo-$\Delta^4$-steroid, thiophenol, formaldehyde, triethylamine and ethanol are heated together under reflux.
10. A compound selected from the group consisting of 4-phenylthiomethyltestosterone, and the acetate and propionate thereof.
11. 4-benzylthiomethyltestosterone.
12. 4-ethylthiomethyltestosterone.
13. 4-n-butylthiomethyltestosterone.
14. 4-(β-hydroxyethyl)thiomethyltestosterone.
15. 4-cyclohexylthiomethyltestosterone.
16. 4-p-tolylthiomethyltestosterone.
17. A compound selected from the group consisting of 2α-methyl-4-phenylthiomethyltestosterone and the acetate thereof.
18. 6α-methyl-4-phenylthiomethyltestosterone.
19. 4-phenylthiomethyl-19-nortestosterone.
20. 4-phenylthiomethylprogesterone.
21. 17α-acetoxy-4-phenylthiomethylprogesterone.
22. 16α-methyl-4-phenylthiomethylprogesterone.
23. 17α - acetoxy-6α-methyl-4-phenylthiomethylprogesterone.
24. 4 - phenylthiomethylpregna - 4,9(11)-diene-3,20-dione.
25. 17α-caproyloxy-4(phenylthiomethyl)progesterone.
26. 11α-hydroxy-4(phenylthiomethyl)testosterone.
27. 9α-fluoro-11β,17β-dihydroxy-17α - methyl-4-phenylthiomethylandrost-4-en-3-one.
28. 17α - acetoxy - 16 - methylene - 4 - phenylthiomethylpregn-4-en-3,20-dione.

No references cited.